Aug. 25, 1970     P. R. PICKELL     3,525,473
AIRCRAFT MOUNTED SPREADER APPARATUS
Filed June 11, 1968     4 Sheets-Sheet 1

INVENTOR
PHILLIP R. PICKELL
BY
*Jack M. Wiseman*
ATTORNEY

Aug. 25, 1970   P. R. PICKELL   3,525,473
AIRCRAFT MOUNTED SPREADER APPARATUS
Filed June 11, 1968   4 Sheets-Sheet 4
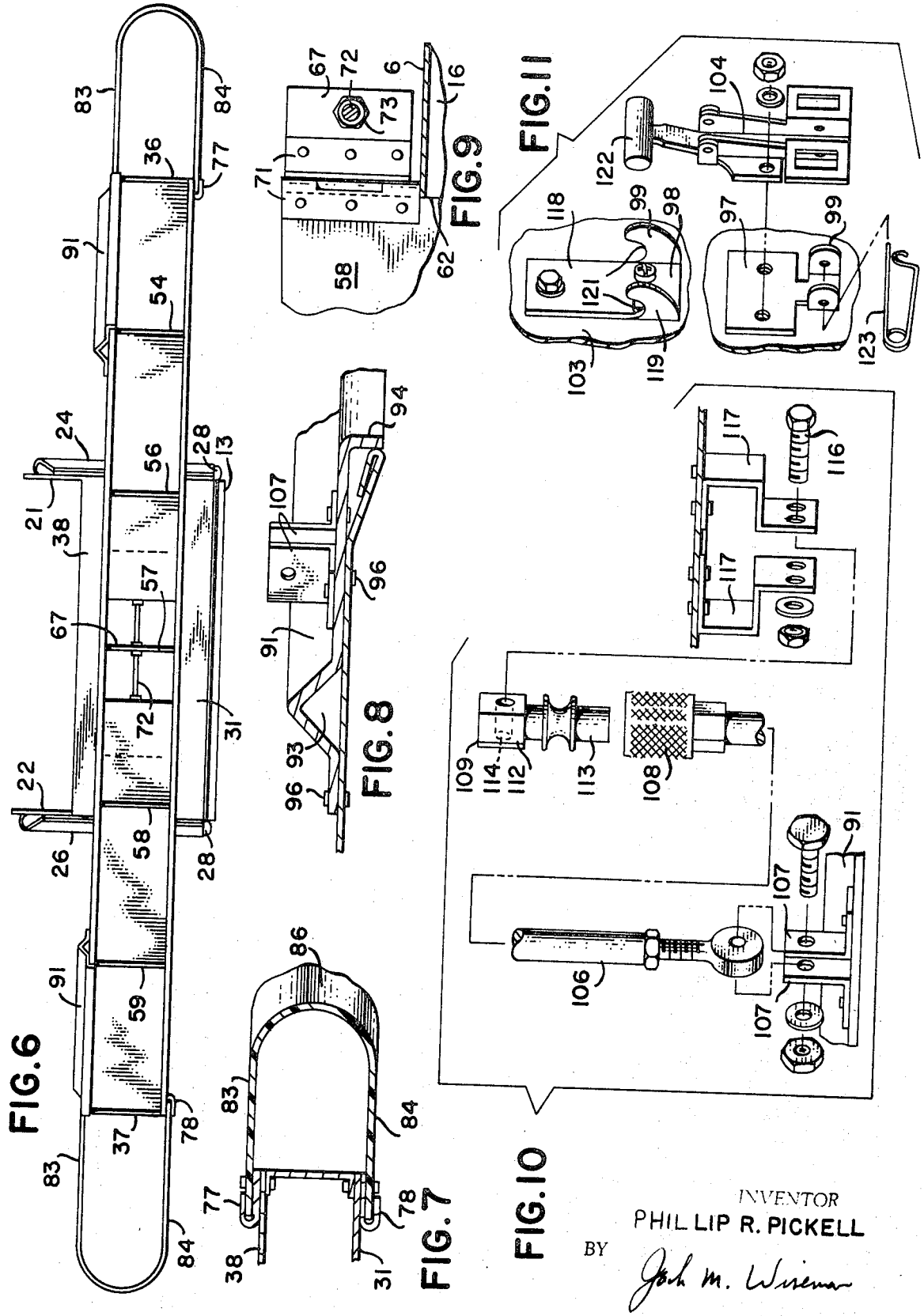
INVENTOR
PHILLIP R. PICKELL
BY
ATTORNEY

United States Patent Office 3,525,473
Patented Aug. 25, 1970

3,525,473
AIRCRAFT MOUNTED SPREADER APPARATUS
Phillip R. Pickell, Las Vegas, Nev., assignor to Agricultural Aviation Engineering Company, Las Vegas, Nev., a corporation of California
Filed June 11, 1968, Ser. No. 736,168
Int. Cl. B05b 17/02
U.S. Cl. 239—171     3 Claims

ABSTRACT OF THE DISCLOSURE

The spreader apparatus of this invention is particularly adapted to disseminate dry materials in granular or powder form from a fast-moving aircraft. The apparatus is configured to take advantage of the velocity with which the apparatus passes through a body of air so as to channel air through the apparatus to provide Venturi action to draw dry granular or dust material into the apparatus to be disseminated by the expanding airstream exhausted therefrom. The apparatus is constructed from sheet metal, and is provided with fixed and adjustable vanes for controlling the flow of air therethrough. Additionally, the apparatus is provided with structure enabling the application of appropriate casters to increase mobility of the apparatus on the ground and facilitate transfer of the apparatus from a storage area to the aircraft.

BACKGROUND OF INVENTION

The modern tendency of mass migration of people from rural to metropolitan centers has resulted in large plots of productive agricultural land being held by few individuals. Because of a lack of labor, cultivation and harvesting processes have had to be mechanized to cope with large acreage with a small labor force. The dissemination of fertilizing type dusts and liquids from aircraft has now become commonplace. It has been found that crop spraying from aircraft is very effective because large areas of growing crops can be effectively sprayed during the early morning hours when the foliage of growing crops is covered with dew. As the dew evaporates, the insecticide remains on the foliage to protect the foliage against ravage by insects.

Heretofore, most spraying apparatus and techniques involved the use of liquids which may be disseminated by a rapidly rotating wire brush in finely dispersed droplets which are caught in the slipstream of the airplane and fall onto the foliage of the crop being sprayed. Another conventional spraying technique is to utilize laterally extending booms having orifices therein for dissemination of liquid spray material under pressure, which again is caught in the slipstream of the aircraft and directed onto the foliage of the crops being sprayed. One of the disadvantages of these two conventional systems is that they are generally restricted to the use of liquid type fertilizers, insecticides and fungicides. It is one of the important objects of the present invention to provide an apparatus capable of attachment to an aircraft and which is effective to disseminate dry materials such as granules or dust or both.

In conventional boom-type or rotary brush-type spray equipment, it is usual to provide auxiliary power means to create sufficient pressure or centrifugal force to effect the dissemination. Such auxiliary power requirements are disadvantageous because at least to some extent they complicate the installation on the aircraft. Accordingly, it is one of the objects of the present invention to provide a spreading or dissemination apparatus for dry materials merely by virtue of the fact that it is drawn through a body of air.

Another disadvantage of conventional-type spray apparatus has been that these apparatuses frequently take the form of fixed appendages attached to the aircraft and which project into the slipstream surrounding the aircraft. It is one of the objects of the present invention to provide a spreader apparatus or disseminating device for dry particle-type pesticides and fertilizers which can be built into the fuselage so that it can be readily removed when desired in the minimum amount of time.

Heretofore, utilizing conventional dusting techniques, the operator has been subject to the vagaries of wind currents and the slipstream to effect deposits. Little control has been exercised over these variable characteristics in conventional dusting equipment. Accordingly, it is one of the objects of the present invention to provide a spreader apparatus or disseminating device which may be adjusted to direct the air stream passing therethrough in specific directions, thus to control the direction of dissemination of the dry materials being spread in a uniform manner.

One of the reasons why dry materials have not heretofore been used more extensively in aircraft spraying and dusting techniques has been that dry material has a tendency to bridge, thus making it difficult to spread or disseminate. Accordingly, it is one of the important objects of the present invention to provide a spreader apparatus or disseminating device in conjunction with an agitating mechanism which delivers dry material in finely divided or particlulate form to the spreader apparatus, which in turn utilizes adjustable vanes and the pressure of the body of air through which it is passing to pick up the finely divided dry material and disseminate it uniformily over the field being treated.

The invention possesses other objects and features of advantage, some of which, with the foregoing, will become apparent from the following description and the drawings. It is to be understood however that the invention is not limited to the embodiment illustrated and described, as it may be embodied in various forms within the scope of the appended claims.

SUMMARY OF THE INVENTION

In terms of broad inclusion, the spreader apparatus or disseminating device of the invention comprises a sheet metal construction having top, bottom and sides, and divided into a forward air scoop portion and a rear spreader or disseminating portion. The forward air scoop portion is divided into a vaned channel or scoop that channels air from the slipstream into the disseminating portion of the apparatus positioned therebehind, and is provided also with a dry material receiving platen onto which the dry, finely divided dust or particles of insecticide, fertilizer or defoliating agent is deposited from an hopper source within the aircraft.

The source of dry material preferably incorporates an agitating assembly effective to break up lumps that might have formed in the dry material so that the material which is deposited on the platen is finely divided and in individual granular particles. To secure effective dissemination of the dry material over a wide area, the material is deposited on the platen directly in front of an intake opening into the rear disseminating portion of the apparatus. Suitable vanes, adjustable in the intake opening to direct air passing into the rear disseminating portion of the apparatus in a selected direction are positioned next adjacent the platen on which the finely divided dry material is deposited.

Means are provided on the apparatus to facilitate mounting the apparatus on the underside of an aircraft. Means are also provided on the apparatus to receive appropriate wheeled casters which may be removably attached to the apparatus in a storage area so that the apparatus may be wheeled out to the air strip and attached to the aircraft. The casters are removed from the apparatus during such time as the apparatus remains attached to the aircraft. When the apparatus is removed from the aircraft, the casters are re-attached, the apparatus is unlatched and wheeled away from the aircraft into a storage area. It will be seen that such mobility and detachability makes it possible to utilize one spreader apparatus or disseminating device in conjunction with several aircraft, in contradistinction to conventional spray apparatus which is ordinarily permanently mounted in the aircraft.

BRIEF DESCRIPTION OF THE DRAWINGS

FIG. 6 is a rear elevation taken in the direction indicated by the arrow 6 in FIG. 2.

FIG. 7 is a fragmentary vertical sectional view taken in the plane indicated by the line 7—7 in FIG. 2.

FIG. 8 is a fragmentary vertical cross-sectional view taken in the plane indicated by the line 8—8 in FIG. 2, and showing the bracket by which the trailing edge of the apparatus is suspended to the underside of an aircraft.

FIG. 9 is a vertical cross-sectional view taken in the plane indicated by the line 9—9 in FIG. 2, showing the relationship between the auxiliary vane structure in the forward air scoop portion of the apparatus and the main vane assembly extending through the rear dissemination portion of the apparatus.

FIG. 10 is a detailed illustration in enlarged scale showing the manner of attachment of the trailing edge of the spreader apparatus to the aircraft.

FIG. 11 is a detailed illustration in enlarged scale showing the latch construction utilized to attach the forward air scoop portion of the spreader apparatus to the aircraft.

DESCRIPTION OF PREFERRED EMBODIMENT

Figure 1:
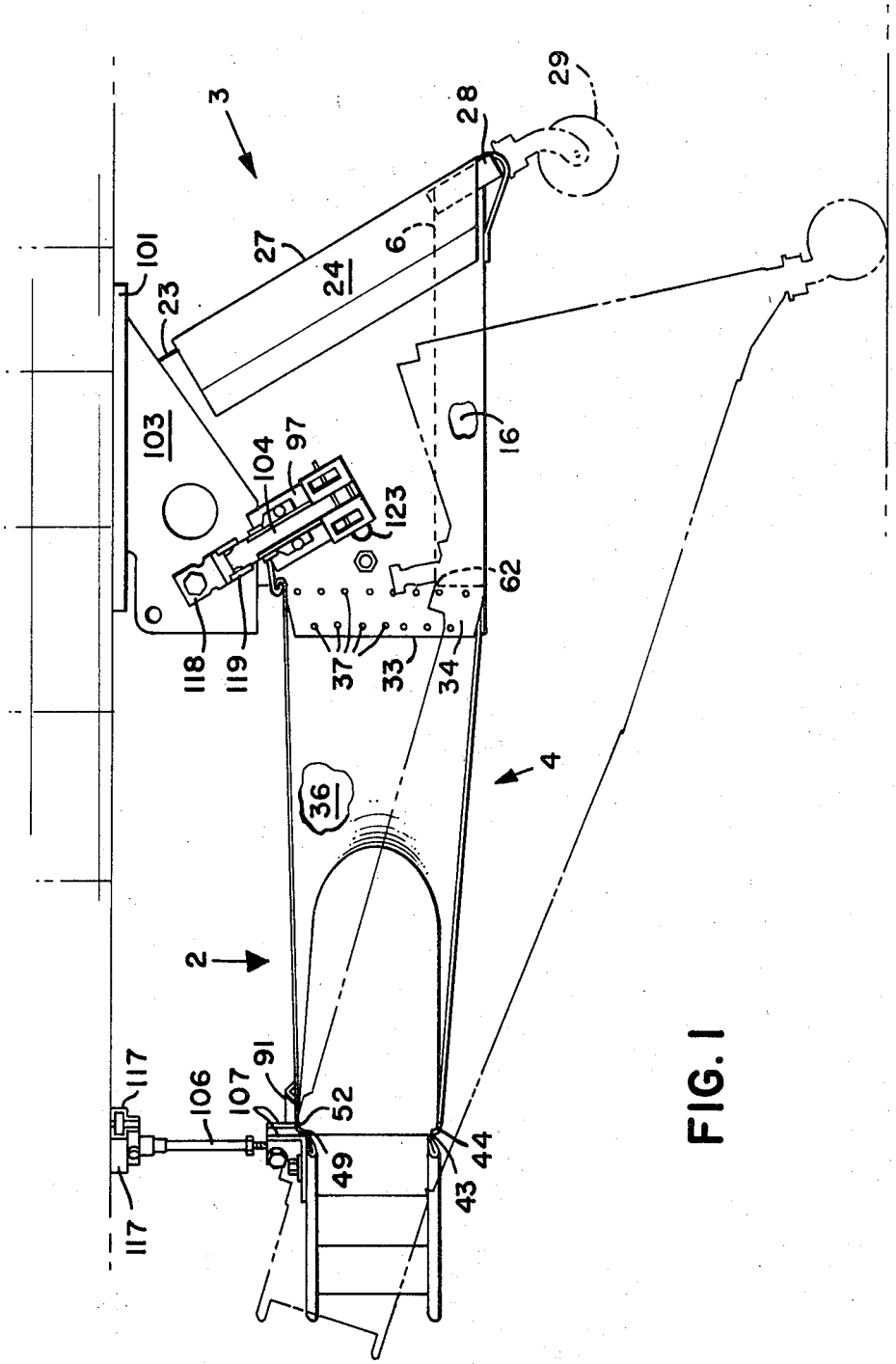
FIG. 1 is a side elevation of the apparatus shown attached to an aircraft. In dash lines, the apparatus is illustrated as attached by its trailing edge to the aircraft, with the forward or air scoop end of the apparatus shown tilted down and equipped with casters in engagement with the pavement.
Figure 2:
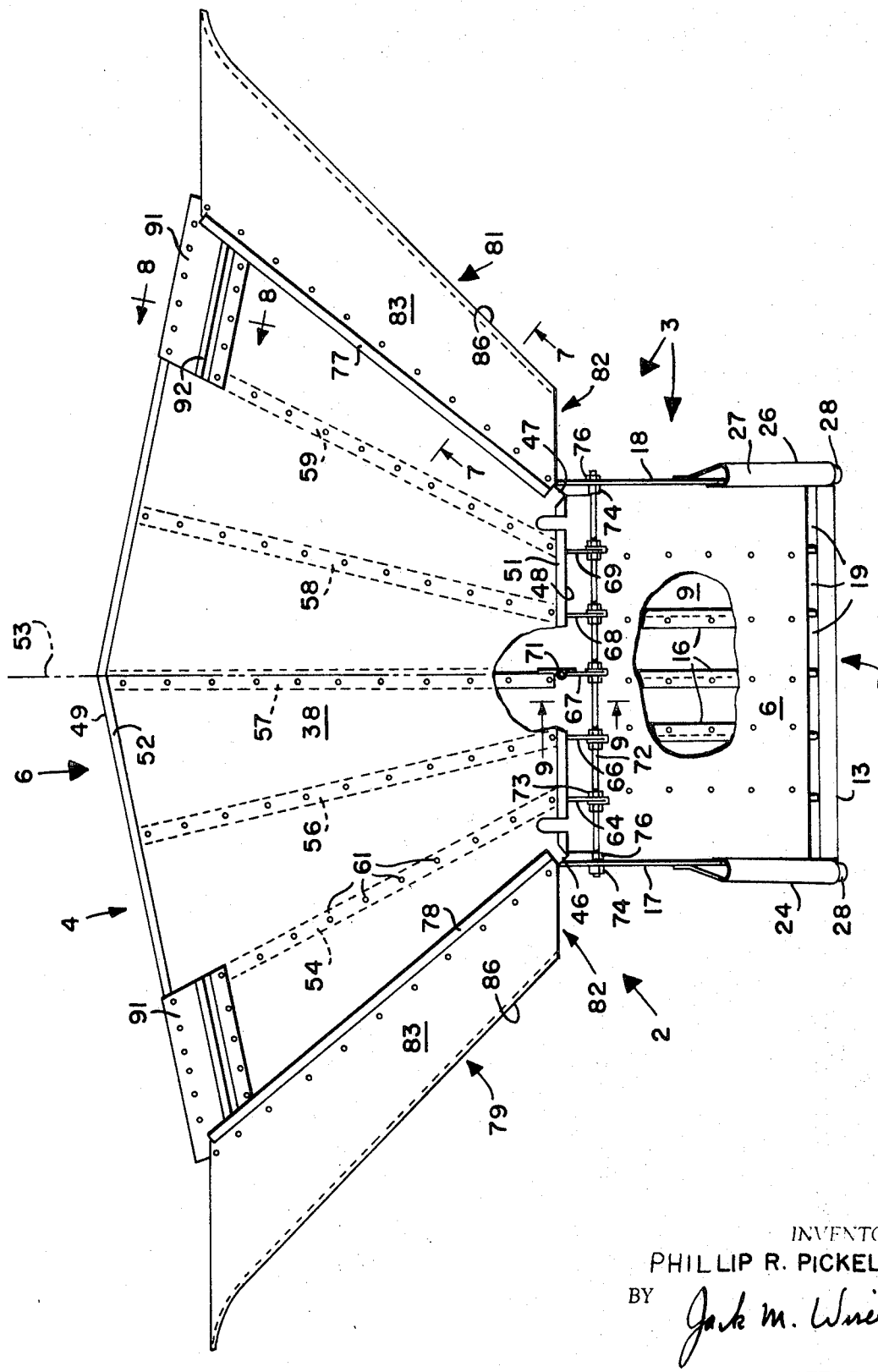
FIG. 2 is a plan view of the apparatus shown apart from the aircraft. Portions of the structure are broken away to show the underlying construction.

In terms of greater detail, and with specific reference to FIGS. 1 and 2, the spreader apparatus or disseminating device of the invention comprises a sheet metal housing designated generally by the numeral 2, and including a forward air scoop portion designated generally by the numeral 3, and a rear dissemination portion designated generally by the numeral 4.

Figure 4:
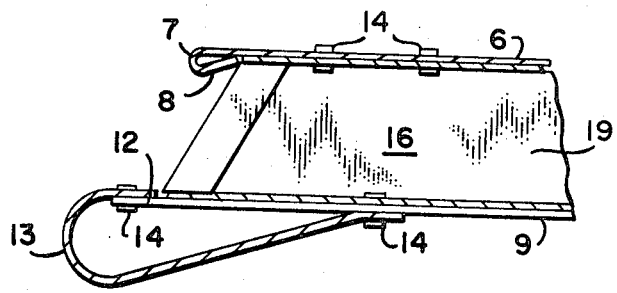
FIG. 4 is a fragmentary vertical cross-sectional view taken in the plane indicated by the line 4—4 in FIG. 2, and illustrating the lower fairing and auxiliary vane construction of the forward air scoop portion of the apparatus.

The forward air scoop portion 3 is relatively shallow in cross-section, as indicated best in FIG. 4, and is provided with a top plate or platen 6, having a nose section 7, bent backwardly upon itself to provide a flange 8 to strengthen the forward edge of the platen. To complete the forwardly projecting air scoop, a bottom plate 9 is provided vertically spaced from the platen and arranged parallel thereto, and provided at its forward edge 12 with a fairing 13 as shown. The fairing is attached to the bottom plate 9 by appropriate rivets 14.

Disposed between the upper plate 6 and the lower plate 9, and extending rearwardly from the forward edge of the scoop, are a plurality of spaced parallel vanes 16 secured along their upper and lower edges to the associated plates 6 and 9 by appropriate rivets or spot welding. Side walls 17 and 18 (FIG. 2) are provided running parallel to the vanes 16, and abut the lateral edges of plates 6 and 9 to form a rectangular passageway 19 through the forward scoop portion of the apparatus. As shown best in FIGS. 1 and 5, the side walls 17 and 18 project upwardly in portions 21 and 22 that extend above the top plate 6 of the forward scoop portion 3. Side wall portions 21 and 22 are inclined rearwardly at their forward edge 23, and are provided on each side portion adjacent the inclined forward edge with fairings 24 and 26.

Fairings 24 and 26 perform a double function. They aid in channeling air efficiently into the apparatus by virtue of the rounded nose portion 27 of the fairing, and each fairing also forms a socket for a rigid metallic tube 28 in each fairing. The tube 28 receives the shank of an appropriate caster assembly 29.

Figure 3:
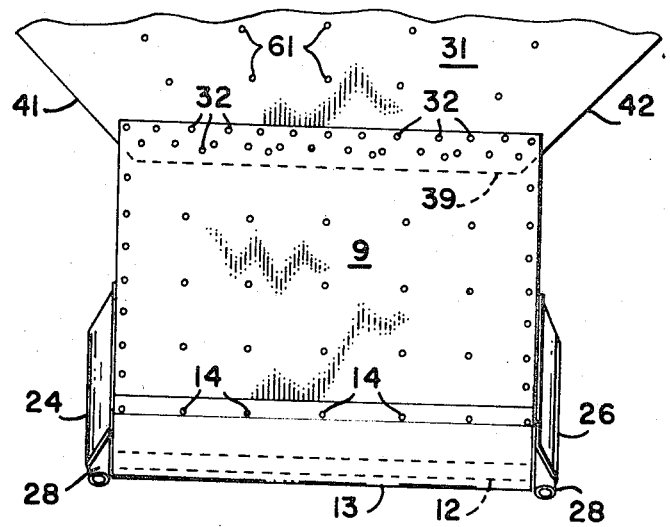
FIG. 3 is a fragmentary elevational view illustrating the bottom side of the forward air scoop portion of the apparatus.

As indicated in FIG. 3, where the forwardly extending scoop portion of the apparatus attaches to the rearwardly projecting dissemination portion, the bottom plate 9 of the forwardly extending scoop portion is secured to the bottom wall or plate 31 of the dissemination portion 4 by appropriate rivets 32. Side walls 17 and 18, and their upwardly projecting portions 21 and 22, extend backwardly to a rear edge 33 the adjacent portion 34 of which is secured to side walls 36 of the dissemination portion by appropriate rivets 37 as shown best in FIG. 1. The opposite side 37 of the dissemination portion 4 is secured in like manner to the side wall 18–22.

From FIG. 2 it will be apparent that side walls 36 and 37 of dissemination portion 4 of the apparatus diverge rearwardly in a direction away from the forwardly extending scoop portion of the apparatus. Also, the side walls 36 and 37 join the bottom plate 31 of the rearwardly extending dissemination portion with the top plate 38 to form a tubular housing or passageway forming a flaring continuation of the passageway 19 extending through the forwardly extending scoop portion 3.

As seen best in FIGS. 1 and 3, the bottom plate 31 is provided with a leading edge portion 39 riveted to the bottom plate of the forwardly projecting scoop portion. Diverging backwardly from the forward edge 39 of the bottom plate are lateral edges 41 and 42 which diverge rearwardly and terminate in a trailing edge 43. To add rigidity to the trailing edge, an edge portion 44 of the plate 31 is bent back upon itself to form a flange.

Top plate 38 of the rearwardly projecting dissemination portion is similarly configured, having divergent lateral edges 46 and 47, extending from the leading edges 48 to the trailing edge 49. As shown in the drawing, the leading edge 48 is formed by a flange 51 bent back upon the plate. In like manner, the trailing edge 49 of top plate 38 is provided with a reinforcing flange 52.

The lateral and divergent side edges 41–42 and 46–47 of the bottom and top plates, respectively, are preferably symmetrical with respect to an axis extending through the median plane of the apparatus. Such median plane is indicated in FIG. 2 by the center line 53. The trailing edges 43 and 49 of the bottom and top plates, respectively, are configured to intercept the center line 53 at an angle, the interception occurring on the center line at a point such that the trailing edge between the center line 53 and the respective side or lateral edges of top and bottom plate are substantially equal to the length of such side plates. From FIG. 2, and from the proportions illustrated, it will thus be seen that the midportions of the trailing edges extend rearwardly from the side edges which, as indicated, fan outwardly to provide a divergent configuration.

The side, top and bottom plates or walls thus form a relatively flat passageway, with the leading edges of the divergent passageway being attached to the forwardly projecting scoop portion 2 as shown. Mounted within the generally divergent passageway, between top and bottom walls thereof, are rearwardly extending vanes 54, 56, 57, 58 and 59. Each of the vanes extends from adjacent the leading edges 39–48 to adjacent the trailing edges 43–49. The vanes are securely mounted between the top and bottom plates by appropriate rivets 61, or by spot welding.

As shown in FIG. 2, the vane 57 is centrally disposed and generally parallel to the center line 53. Vanes 54 and 56, to the left of the center line as viewed in FIG. 2, diverge from such center line and from each other to define three separate passageways on the left side of the center line. Vanes 58 and 59, positioned on the right side of the center line 53, similarly diverge from the center line and from each other to define three separate passageways on the right side of the center line. Inasmuch as these passageways increase in cross-section from adjacent leading edges 39–48 of the chamber, it will be appreciated that as a volume of air is admitted to the passageways, it expands to fill the increased volumetric capacity of the passageway adjacent the trailing edge of the apparatus.

The leading edge of each of the vanes 54–59 is riveted to the trailing edge of each of the vanes 16 enclosed within the forwardly projecting scoop portion of the apparatus, so that the separate passageways defined by the vanes 16 communicate with the passageways formed in the rearwardly extending dissemination portion. Thus, it will be appreciated that as the apparatus is drawn through the air, a stream of air is forced between the top and bottom plates 6–9, respectviely, of the forwardly projecting scoop portion of the apparatus, passes through this section and then enters the passageways between the parallel vanes 16, progresses rearwardly expanding in volume as it passes through the passageways that diverge outwardly toward the trailing edge of the apparatus, thus tending to fan out or spread widely with respect to the stream of air entering the apparatus.

Figure 5:
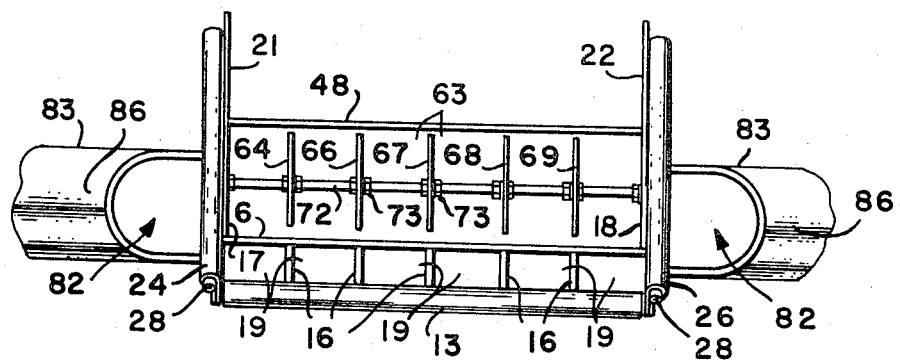
FIG. 5 is a front elevation of the device taken in the direction indicated by the arrow 5 in FIG. 2.

To lend a measure of control over the air passing through the apparatus, it will be seen from FIG. 5 that the vanes 54–59 are approximately three times as high as vanes 16 in the forwardly projecting scoop portion of the apparatus. Additionally, the top plate of the forwardly projecting scoop portion is provided with a rear edge 62 (FIGS. 1 and 9) that abuts the leading edge of each of the vanes 54–59. Inasmuch as the vanes 54–59 are deeper than the depth of vanes 16, it will be apparent that an opening 63 (FIG. 5) is provided into each of the passageways defined by vanes 54–59.

Thus, as the apparatus is drawn through the air, the air stream flowing over plate 6 is admitted into the passageways defined by the vanes 54–59 through the openings 63. Since the openings 63 open into the same passageways into which the supplementary passageways defined by vanes 16 discharge air, it will be apparent that air is admitted to the passageways in the dissemination section from two different sources; thus aiding the flotation of the material in the rear of the spreader.

To control the flow of air through openings 63, adjustable vane sections 64, 66, 67, 68 and 69 are provided, each having its trailing edge riveted to an appropriate hinge 71, mounted on the leading edge of one of the vanes 54–59 with which the adjustable vane is associated. To effect adjustment of the adjustable vanes, an adjustment rod 72 is provided extending through each of the vanes intermediate its top and bottom edges and adjacent its leading edge. Each of the adjustable vane portions is appropriately secured to the adjustment rod through appropriate nuts 73 as shown. The ends of the adjustment rod extend through appropriate apertures in side walls 17 and 18, shown best in FIGS. 1 and 2, and are provided with securing nuts 74 and 76.

It will thus be seen that the adjustable vane portions 64–69 not only control the direction in which air will flow through the passageway defined by the vanes 54–59 in the rearwardly extending dissemination portion, but they are also effective, through appropriate adjustment, to control the effective cross-sectional area of the openings 63 leading into the passageways defined in the rearwardly extending dissemination portion. Such flexibility of adjustment provides for control over the amount of the air and material being discharged in each section of the apparatus so as to permit the attainment of a uniform ground deposit of material behind the aircraft.

Inasmuch as the attachment of any kind of appendage on an aircraft that projects into the air stream surrounding an aircraft in flight will create a certain amount of turbulence, and since such turbulence tends to produce flight instability, it is important that where needed a means be provided to diminish such turbulence. Thus, as best shown in FIGS. 2 and 7, the lateral divergent edges of the top and bottom plates are provided with fairing support flanges 77 and 78, each having one leg riveted to the associated plate, and the pair extending outwardly in open U-shaped channels to receive laterally extending fairings 79 and 81.

As indicated in the drawings, each of the fairings 79 and 81 constitutes an elongated rearwardly opening passageways defined by top walls 83 and bottom walls 84, joined by a lateral and rearwardly extending divergent wall 86. The fairings 79 and 81 thus form tubular passageways preferably fabricated from an appropriate synthetic resinous material. The passageway through the fairings is open at its rear end, and since it follows the generally divergent direction of the side walls 36 and 37 with which they are associated, it will be apparent that air entering the passageway 82 at the forward or leading edge of each of the fairings is caused to expand and change its direction to be directed laterally outwardly adjacent the trailing edge of the apparatus. This aids the lateral spread of conveyed material within confined boundaries of air.

A comparison of FIGS. 1 and 2 will indicate that the depth of the rearwardly extending dissemination portion of the apparatus is deeper at its leading edge 48 than at the trailing edge, thus resulting in bottom and top plates 31–38 converging toward each other over their wide expanse toward the trailing edges thereof. Air entering the passageways defined between vanes 54 and 59 is caused to change its direction in two respects; on the one hand being caused to diverge outwardly as it approaches the trailing edge of the apparatus, and on the other hand being compressed into a more shallow stream than the stream that entered the apparatus.

To mount the spreader apparatus on an aircraft, the top plate 39 is provided adjacent each of its rearmost corners with a bracket 91, the bracket being elongated as illustrated in FIG. 2, and having a V-shaped section 92 raised out of the plane of the plate to provide a passageway 93 between the top plate and the underside of the bracket. This construction is shown best in FIG. 8, which also shows that the trailing edge of the bracket is provided with a downwardly projecting flange 94 that encloses the trailing edge of the top plate. The flange 94, engaging as it does the trailing edge, lends rigidity to the structure and removes some of the stress from rivets 96 that attach the bracket to the top plate.

Adjacent the union of the forwarding projecting scoop portion 3 and the rearwardly extending dissemination portion 4 of the apparatus, side plates 17–18 and extensions 21–22 thereof are provided with a pair of latch plates 97, each riveted to an associated side plate. One edge of each latch plate is provided with a laterally extending tongue portion 98, the lateral edges of which are bent upwardly to provide a pair of lugs 99 bent away from the associated side plate to provide a U-shaped channel on the latch plate. To attach the apparatus to an aircraft, the aircraft is provided with an appropriate support frame 101, on which is mounted an appropriate agitator gate assembly (not shown) forming no part of this invention, but which is interposed between a bin (not shown) within the aircraft filled with the material to be dispensed, and the induction end of the spreader apparatus.

The agitator assembly is attached or supported to the support frame 101 and functions to insure that the dry granular or dust material being delivered to the spreader apparatus is finely divided rather than being lumpy as might be expected if the dry material were stored for a considerable time.

Depending from support frame 101, are a pair of side plates 102 and 103, each of which is provided with a plurality of mounting apertures on which is appropriately secured a latch structure 104 configured to engage the outwardly extending U-shaped lugs 99 so as to detachably secure the forwardly extending scoop portion of the spreader apparatus to the support frame 101.

The trailing edge of the spreader apparatus, on the other hand, is supported by a pair of upwardly extending connecting rods 106, the lower ends of which are provided with laterally extending right-angle extensions 107 caught in the passageway 93 beneath bracket plate 91, and locked therein by appropriate safety pins (not shown). The upper ends of the connecting rods 106 are provided with sockets 108, each adapted to be detachably engaged by an appropriate plug 109. Each plug is provided with a head portion 112 and a shank 113, the head 112 being provided with a transversely extending aperture 114 to receive a pin 116 therein, which pivotally attaches the head 112 between two appropriate brackets 117 attached to an appropriate supporting member on the aircraft.

It will thus be seen that since the interconnection of the plug head 112 with brackets 117 is pivotal in nature, and since the interconnection of the lateral extensions 107 with bracket plates 91 is also pivotal, the trailing edge of the spreader apparatus may be pivotally connected to the underside or supporting surface of the aircraft while the forwardly projecting scoop portion of the spreader apparatus is resting on the pavement on the caster assemblies 29. With the trailing edge pivotally connected as just described, it then becomes a simple matter to elevate the forwardly extending scoop portion of the apparatus into position whereby the latch plate 97 may be engaged by the latch 104 on the spreader. In this position, the spreader apparatus remains detachably yet safely secured to the supporting aircraft, and the caster assemblies 29 may be removed until the apparatus is removed from the aircraft. The caster assemblies are then reapplied to wheel the spreader apparatus into a storage area.

To facilitate attachment of the forwardly projecting scoop portion of the apparatus to the latch plate 97, an auxiliary support plate 118 is fastened to the aircraft, and is provided with outwardly projecting lugs 119 having top edges 121 engageable by a transversely extending lock piece 122 formed on the end of latch lug 104. Thus, when the forwardly projecting scoop portion of the spreader apparatus is lifted into position and the latch 104 engages the outwardly extending lugs 99 of latch plate 97, the lock piece 122 engages the top edges 121 of the lugs 119. This relationship supports the weight of the forwardly projecting scoop portion of the spreader apparatus while suitable safety pins 123 are inserted through appropriate apertures formed in the upstanding lugs 99 on the latch plate. As thus locked in place, it is apparent that the apparatus is detachably secured to the aircraft, yet is secured in position for maximum security during flight.

Having thus described the invention, what is claimed to be novel and sought to be protected by letters patent is as follows:

1. In a spreader apparatus adapted for dissemination of dry particulate material from an aircraft, the combination comprising:
   (a) a hollow housing having a forwardly extending air scoop portion and a rearwardly extending dissemination portion defining a passageway through the housing;
   (b) vane means within the housing for controlling the distribution and passage of air therethrough;
   (c) means associated with the forwardly extending air scoop portion for receiving and injecting dry particulate material into said housing;
   (d) means to detachably secure the spreader apparatus to the aircraft; and
   (e) a pair of separate inlets are provided to admit air into said housing, one of said air inlets being adjacent the leading edge of said forwardly extending air scoop portion and the other air inlet being adjacent the leading edge of said rearwardly extending dissemination portion of the apparatus.

2. The combination according to claim 1, wherein one of the air inlets directs air volume below material being conveyed to prevent the settling of material on the bottom of said vanes, thus imparting a flotation action on the material preventing material friction and deceleration.

3. In a spreader apparatus adapted for dissemination of dry particulate material from an aircraft, the combination comprising:
   (a) a hollow housing having a forwardly extending air scoop portion and a rearwardly extending dissemination portion defining a passageway through the housing;
   (b) vane means within the housing for controlling the distribution and passage of air therethrough;
   (c) means associated with the forwardly extending air scoop portion for receiving and injecting dry particulate material into said housing; and
   (d) means to detachably secure the spreader apparatus to the aircraft;
   (e) said rearwardly extending divergent dissemination portion of the apparatus is provided with fairings extending tranversely away from the housing;
   (f) said laterally extending fairings attached to the side walls of said rearwardly extending dissemination portion constitute auxiliary air scoops configured to receive a stream of air and change its direction so as to direct it laterally outwardly.

References Cited

UNITED STATES PATENTS

| | | | |
|---|---|---|---|
| 1,886,418 | 11/1932 | Muchnic | 292—66 X |
| 2,473,212 | 6/1949 | Monson | 239—654 |
| 2,956,768 | 10/1960 | Livingston | 248—324 |

LLOYD L. KING, Primary Examiner

T. C. CULP, Jr., Assistant Examiner

U.S. Cl. X.R.

239—654; 244—136